(12) United States Patent
Sawai

(10) Patent No.: US 6,176,583 B1
(45) Date of Patent: Jan. 23, 2001

(54) POLARIZATION CONVERSION DICHROIC MIRROR AND A LIQUID CRYSTAL PROJECTOR

(75) Inventor: Yasumasa Sawai, Yamatotakada (JP)

(73) Assignee: Minolta Co., Ltd., Osaka (JP)

( * ) Notice: Under 35 U.S.C. 154(b), the term of this patent shall be extended for 0 days.

(21) Appl. No.: 09/335,414

(22) Filed: Jun. 17, 1999

(30) Foreign Application Priority Data

Jun. 22, 1998 (JP) .............................................. H10-174236

(51) Int. Cl.$^7$ .................................................. G03B 21/14
(52) U.S. Cl. .............................. 353/20; 353/84; 353/31; 359/634
(58) Field of Search ................................. 353/20, 31, 33, 353/34, 37, 84; 349/8, 9, 7, 5; 359/634, 490

(56) References Cited

U.S. PATENT DOCUMENTS

| | | |
|---|---|---|
| 3,767,290 | * 10/1973 | Lang et al. . |
| 4,806,750 | * 2/1989 | Vincent ................................. 250/226 |
| 5,231,431 | 7/1993 | Yano et al. ............................. 353/31 |
| 5,648,870 | * 7/1997 | Mitsutake .............................. 353/20 |
| 5,657,164 | * 8/1997 | Shuman ................................ 359/634 |
| 5,833,339 | * 11/1998 | Sarayeddine .......................... 353/20 |
| 5,921,650 | * 7/1999 | Doany et al. .......................... 353/84 |
| 5,959,773 | * 9/1999 | Gagnon ................................. 349/8 |
| 5,963,372 | * 10/1999 | Barak .................................... 359/488 |

FOREIGN PATENT DOCUMENTS

| | | |
|---|---|---|
| 63-116123 | 5/1988 | (JP) . |
| 3-78738 | 4/1991 | (JP) . |
| 3-249639 | 11/1991 | (JP) . |
| 8-334727 | 12/1996 | (JP) . |

* cited by examiner

Primary Examiner—William Dowling
(74) Attorney, Agent, or Firm—Sidley & Austin

(57) ABSTRACT

A mirror is provided with, from the incident side, a dichroic surface, a quarter-wave plate, and a reflecting surface. The dichroic surface transmits a light component covering a specific wavelength range and reflects light components covering other wavelength ranges. The quarter-wave plate is for rotating a polarization the specific wavelength range covered by the light component transmitted through the dichroic surface. The reflecting surface reflects the light component having passed through the quarter-wave plate to direct it back to the quarter-wave plate.

15 Claims, 11 Drawing Sheets

POLARIZATION CONVERSION DICHROIC MIRROR AND A LIQUID CRYSTAL PROJECTOR

This application is based on application No. H10-174236 filed in Japan, the content of which is hereby incorporated by reference.

BACKGROUND OF THE INVENTION

1. Field of the Invention

The present invention relates to a polarization conversion dichroic mirror and a liquid crystal projector employing such a polarization conversion dichroic mirror.

2. Description of the Prior Art

FIG. 10 shows an example of a conventional liquid crystal projector. This liquid crystal projector is of the so-called separated-pupil illumination type, and is provided with a light source unit (U1), an illumination relay optical system (U2), a color separating/integrating cross dichroic prism (DP), reflection-type liquid crystal panels (PR, PG, and PB), a projection lens system (U3), and other components. The projection lens system (U3) includes a reflecting mirror (8) for directing illumination light (L1) to the reflection-type liquid crystal panels (PR, PG, and PB). The light source unit (U1) is composed of a light source (1), a reflector (2), a first lens array (3), a polarizing prism (4), a second lens array (5), a half-wave plate (6), a merging lens element (7), and other components.

The beam of randomly-polarized white light emitted from the light source (1) is first reflected from the reflector (2), is then separated into an S-polarized light component and a P-polarized light component by the polarizing-separating surface (4a) of the polarizing prism (4), and then forms a light source image on the second lens array (5). Then, the P-polarized light component is converted into an S-polarized light component by the half-wave plate (6). Thereafter, the light beam, now containing only an S-polarized light component, passes through the merging lens element (7). In this way, linearly-polarized white light is emitted as illumination light (L1) from the light source unit (U1). The illumination light (L1) is then relayed by the illumination relay optical system (U2) so as to be re-focused in the vicinity of the aperture stop (ST) (I: a virtual image plane).

Then, the illumination light (L1) is reflected from the reflecting mirror (8) disposed in the vicinity of the aperture stop (ST), and is thereby introduced into the projection lens system (U3). After passing through the rear portion of the projection lens system (U3), the illumination light (L1) enters the cross dichroic prism (DP). The cross dichroic prism (DP) has a B reflecting surface (RB) and an R reflecting surface (RR). Of the light components of three primary colors (R, G, and B) constituting the white light (L1), the B (blue) light component (BS) is reflected from the B reflecting surface (RB), and the R (red) light component (RS) is reflected from the R reflecting surface (RR). Thus, the cross dichroic prism (DP) transmits the G (green) light component (GS) straight and simultaneously reflects the R and B light components (RS and BS) in opposite directions. In this way, the illumination light (L1) is separated into three light components of different colors (BS, GS, and RS).

On the optical paths of the individual light components of three colors (BS, GS, and RS) thus separated are disposed the three reflection-type liquid crystal panels (PB, PG, and PR), which display the images of their respective light components. Thus, the individual light components of three colors (BS, GS, and RS) illuminate the display surfaces of their respective reflection-type liquid crystal panels (PB, PG, and PR), and are then reflected therefrom. The light components of three colors (BS, GS, and RS) reflected from the liquid crystal panels (PR, PG, and PB) are then integrated together by the cross dichroic prism (DP) so as to be formed into a projection light beam (L2), which is then projected through the projection lens system (U3) to form an enlarged, color-integrated image on a screen (not shown).

In the conventional liquid crystal projector described above, illumination light (L1) is made to contain only an S-polarized light component (BS, GS, and RS) before being directed into the cross dichroic prism (DP). For example, assume that the transmittance of the cross dichroic prism (DP) for S-polarized light drops to 50% at a cutoff wavelength of 580 nm on its R reflecting surface (RR) and at a cutoff wavelength of 510 nm on its B reflecting surface (RB). In this case, the G light component (GS) illuminating the liquid crystal panel (PG) covers a wavelength range from 510 nm to 580 nm, with its energy reduced to 50% at the wavelengths of 510 nm and 580 nm.

The G light component (GS) reflected from the liquid crystal panel (PG) is integrated into the projection light beam (L2), and is then transmitted through the R and B reflecting surfaces (RR and RB) of the cross dichroic prism (DP) once again. Here again, only 50% of the light having the wavelengths of 510 nm and 580 nm is transmitted through the R and B reflecting surfaces (RR and RB). Consequently, when the projection light beam (L2) reaches the screen, its energy at the wavelengths of 510 nm and 580 nm has dropped to as little as 25%. Thus, within the projection light beam (L2), the wavelength range covered by the G light component (GS) is narrowed to a wavelength range (for example, from 520 nm to 570 nm) in which a transmittance of approximately 70% (i.e. a two-way transmittance of 50%) or above is secured on the R and B reflecting surfaces (RR and RB).

The same description applies also to the R and B light components (RS and BS). The illumination light (L1) is separated into light components whose wavelength ranges are determined by the wavelength ranges (580 nm or above for the R light component, and 510 nm or below for the B light component) in which the R and G reflecting surfaces (RR and RG) offer a reflectance of 50% or more. In contrast, the projection light beam (L2) is composed of light components whose wavelength ranges are narrowed to the wavelength ranges (for example, 590 nm or above for the R light component, and 500 nm or below for the B light component) in which the R and G reflecting surfaces (RR and RG) offer a reflectance of 70% (i.e. a two-way reflectance of 50%) or above. These values are rough estimates made for a principal ray. For light rays traveling at different angles from principal rays, the wavelength ranges of the light components of three colors (BS, GS, and RS) are even narrower.

In other words, the conventional liquid crystal projector as shown in FIG. 10 suffers from a loss in light energy (i.e. a loss in the quantity of light) in the wavelength ranges around the boundary wavelengths between light components of different colors (i.e. around cutoff wavelengths). As shown in FIG. 11, the lost light becomes stray light (LG) that undergoes reflection and transmission over and over again in and around the cross dichroic prism (DP). Such stray light (LG) causes ghosts in the projected image and degrades the contrast thereof.

SUMMARY OF THE INVENTION

A first object of the present invention is to provide a liquid crystal projector that does not suffer from a loss in the quantity of light in the wavelength ranges around cutoff wavelengths.

A second object of the present invention is to provide a polarization conversion dichroic mirror for realizing such a liquid crystal projector.

To achieve the above object, according to one aspect of the present invention, a mirror is provided with, from the side on which a light beam is incident (the incident side), a dichroic surface, a quarter-wave plate, and a reflecting surface. The dichroic surface transmits a light component covering a specific wavelength range and reflects light components covering other wavelength ranges. The quarter-wave plate is adapted to the wavelength range covered by the light component transmitted through the dichroic surface. The reflecting surface reflects the light component having passed through the quarter-wave plate to direct it back to the quarter-wave plate.

According to another aspect of the present invention, an optical apparatus is provided with a mirror and a polarization-conversion optical unit. The mirror is composed of, from the incident side, a dichroic surface for transmitting a light component covering a specific wavelength range and reflecting light components covering other wavelength ranges, a quarter-wave plate adapted to the wavelength range covered by the light component transmitted through the dichroic surface, and a reflecting surface for reflecting the light component having passed through the quarter-wave plate to direct it back to the quarter-wave plate. The polarization-conversion optical unit shines onto the mirror the light beam being composed of linearly-polarized light components of which all have the same polarization direction. The mirror converts the light beam being composed of linearly-polarized light components of which all have the same polarization direction into a light beam being composed of light components of which the light component that covers the wavelength range transmitted through the dichroic surface has a polarization direction perpendicular to the polarization directions of the other light components.

According to another aspect of the present invention, an optical apparatus is provided with a mirror and a polarization-conversion optical unit. The mirror is composed of, from the incident side, a dichroic surface for transmitting a light component covering a specific wavelength range and reflecting light components covering other wavelength ranges, a quarter-wave plate adapted to the wavelength range covered by the light component transmitted through the dichroic surface, and a reflecting surface for reflecting the light component having passed through the quarter-wave plate to direct it back to the quarter-wave plate. The polarizationconversion optical unit shines onto the mirror the light beam being composed of light components of which the light component that covers the wavelength range transmitted through the dichroic surface has a polarization direction perpendicular to the polarization directions of the other light components. The mirror converts the light beam being composed of light components of which the light component that covers the specific wavelength range transmitted through the dichroic surface has a polarization direction perpendicular to the polarization directions of the other light components into a light beam being composed of linearly-polarized light components of which all have the same polarization direction.

According to another aspect of the present invention, a projector is provided with a light source unit, a color separating unit, image display units, a color integrating unit, a projection optical system, a mirror, and a polarization-conversion optical unit. The light source unit emits linearly-polarized white light. The color separating unit separates the white light emitted from the light source unit into a plurality of light components of different colors. The image display units, which are disposed one on each of the optical paths of the light components of different colors, display the images of the light components and emit the light components incident thereon after modulating the light components according to the images displayed thereon. The color integrating unit integrates together the light components emitted from the image display units. The projection optical system displays an image by projecting the light components thus integrated together. The mirror, which is disposed on the optical path between the color-integrating unit and the screen, is composed of, from the incident side, a dichroic surface for transmitting a light component covering a specific wavelength range and reflecting light components covering other wavelength ranges, a quarter-wave plate adapted to the wavelength range covered by the light component transmitted through the dichroic surface, and a reflecting surface for reflecting the light component having passed through the quarter-wave plate to direct it back to the quarter-wave plate. The polarization-conversion optical unit, which is disposed between the light source unit and the color integrating unit, converts the polarization plane of the light component transmitted through the dichroic surface of the mirror so as to make a polarization direction of that light component perpendicular to the polarization directions of the other light components.

According to still another aspect of the present invention, a projector is provided with a light source unit, a color separating unit, image display units, a color integrating unit, a projection optical system, a mirror, and a polarization-conversion optical unit. The light source unit emits linearly-polarized white light. The color separating unit separates the white light emitted from the light source unit into a plurality of light components of different colors. The image display units, which are disposed one on each of the optical paths of the light components of different colors, display the images of the light components and emit the light components incident thereon after modulating the light components according to the images displayed thereon. The color integrating unit integrates together the light components emitted from the image display units. The projection optical system displays an image by projecting the light components thus integrated together. The mirror, which is disposed on the optical path between the color-integrating unit and the screen, is composed of, from the incident side, a dichroic surface for transmitting a light component covering a specific wavelength range and reflecting light components covering other wavelength ranges, a quarter-wave plate adapted to the wavelength range covered by the light component transmitted through the dichroic surface, and a reflecting surface for reflecting the light component having passed through the quarter-wave plate to direct it back to the quarter-wave plate. The polarizatio-nconversion optical unit converts the polarization plane of the light component transmitted through the dichroic surface so as to make the polarization direction of that linearly-polarized light component perpendicular to the polarization direction of the other light components with respect to the mirror.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Hereinafter, polarization conversion dichroic mirrors and liquid crystal projectors embodying the present invention will be described with reference to the accompanying drawings. Note that, in the following descriptions, the components that play the same or corresponding roles in different embodiments will be identified with the same reference symbols, and overlapping descriptions will be omitted.

<Polarization Conversion Dichroic Mirrors (FIGS. 1 and 5)>

Figure 1:
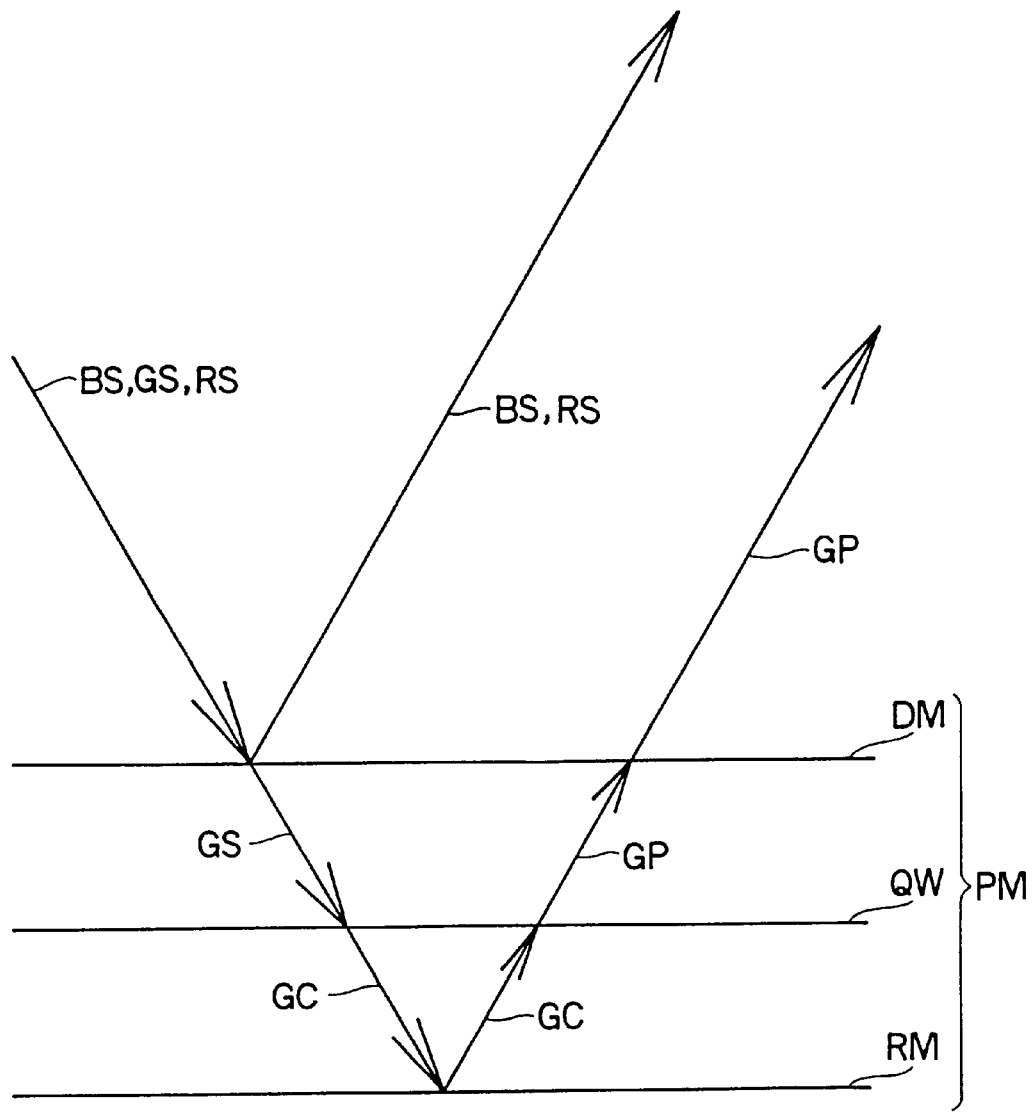
FIG. 1 is a sectional view schematically illustrating a polarization conversion dichroic mirror according to the present invention.

FIG. 1 shows the outline of the structure of a polarization conversion dichroic mirror (PM) embodying the invention. This polarization conversion dichroic mirror (PM) is composed of, from the incident side, a dichroic surface (DM), a quarter-wave plate (QW), and a mirror surface (RM) arranged parallel to and next to one another. The dichroic surface (DM) is formed as a dichroic mirror that, of the light components of three primary colors (R, G, and B), transmits the G (green) light component (GS) that covers the wavelength range of green light and reflects the B (blue) and R (red) light components (BS and RS) that cover the wavelength ranges of blue and red light, respectively. The quarter-wave plate (QW) is adapted to the wavelength range of the G light component (GS) that has passed through the dichroic surface (DM). The mirror surface (RM) is formed as a flat-surfaced reflecting mirror that reflects the G light component (GC) that has passed through the quarter-wave plate (QW).

When S-polarized (linearly-polarized) white light (BS, GS, and RS) is shone onto the dichroic surface (DM), it reflects the B and R light components (BS and RS) and transmits the G light component (GS), keeping all the three light components S-polarized. The G light component (GS) transmitted through the dichroic surface (DM) passes through the quarter-wave plate (QW), is thereby converted into circularly-polarized light, is then reflected from the reflecting mirror (RM), then passes through the quarter-wave plate (QW) once again, and is thereby formed into P-polarized light. Thus, the G light component (GS), by being transmitted through the quarter-wave plate (QW) twice, has its polarization direction rotated through 90 degrees, and is thus converted from S-polarized light into P-polarized light with respect to the dichroic surface (DM).

The G light component (GP) transmitted through the quarter-wave plate (QW) twice then passes through the dichroic mirror (DM) once again so as to be integrated together with the B and R light components (BS and RS) into white light. Thus, the white light reflected from the polarization conversion dichroic mirror (PM) includes S-polarized B and R light components (BS and RS), and a P-polarized G light component (GP). In this way, by the use of a polarization conversion dichroic mirror (PM), the polarization direction of the G light component that covers the wavelength range of green light can be converted with ease from S-polarized light to P-polarized light, and vice versa.

Although a dichroic surface (DM) that transmits the G light component is employed in the example described above, it is also possible to use instead a dichroic surface (DM) that reflects the G light component. However, it is advisable to use a dichroic surface (DM) that transmits the G light component because it is easier to design and manufacture a suitable dichroic film. It is also possible to design a polarization conversion dichroic mirror (PM) that converts the polarization direction of the B or R light component, or even the light component of another color, instead of the G light component. However, in a case where the light components of three colors R, G and B are subjected to color separation and integration in a liquid crystal projector, it is preferable that the light components covering wavelength ranges contiguous to each other have different polarization directions in order to obtain maximum results in color separation and integration. Accordingly, it is preferable that the G light component have a different polarization direction from the B and R light components. In this way, by the use of a dichroic surface (DM) offering the desired polarization characteristics, the polarization direction of the light component covering a specific wavelength range can be converted with ease.

Figure 5:
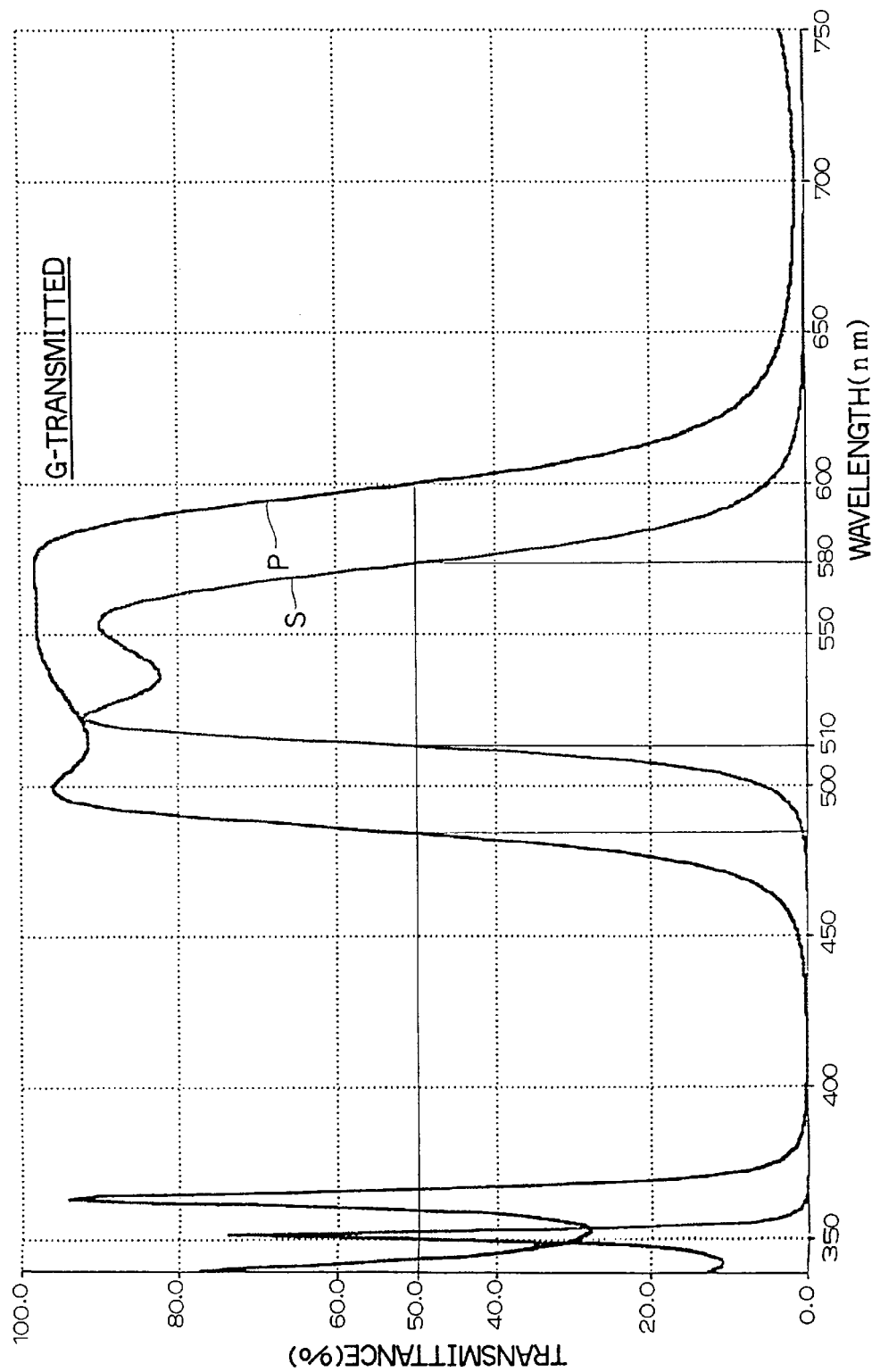
FIG. 5 is a graph showing the spectral characteristics of the dichroic surface that transmits the G light component.

FIG. 5 is a graph showing the spectral characteristics of a dichroic surface (DM) that transmits the G light component incident thereon at 45°. As will be understood from this graph, the wavelength range covered by the transmitted G light component is wider for P-polarized light than for S-polarized light. Accordingly, by shining the G light component onto the dichroic surface (DM) first as S-polarized light, it is possible to shine the G light component onto the dichroic surface (DM) as P-polarized light next time. This helps minimize the loss of light by minimizing the effect of the cutoff characteristics of the dichroic surface (DM) (i.e. the property by which the dichroic surface (DM) prevents transmission of the light component covering a wavelength range higher or lower than a predetermined wavelength range). In contrast, if the G light component is shone onto the dichroic surface (DM) first as P-polarized light, when it is shone onto the dichroic surface (DM) as S-polarized light next time, it is affected by the cutoff characteristics of the dichroic surface (DM). As a result, the portions of the individual light components at and around the boundary wavelengths are cut off. In this case, however, the polarization conversion dichroic mirror (PM) acts as a trimming filter, and therefore it is possible to obtain high color purity in the individual light components of different colors. Note that, as long as it is possible to achieve conversion of the polarization direction of the light component of a specific color, the G light component may be shone onto the polarization conversion dichroic mirror (PM) at any incident angle other than 45°.

<Panel-Reflection-Type Liquid Crystal Projector (FIGS. 2, 6, and 7)>

Figure 2:
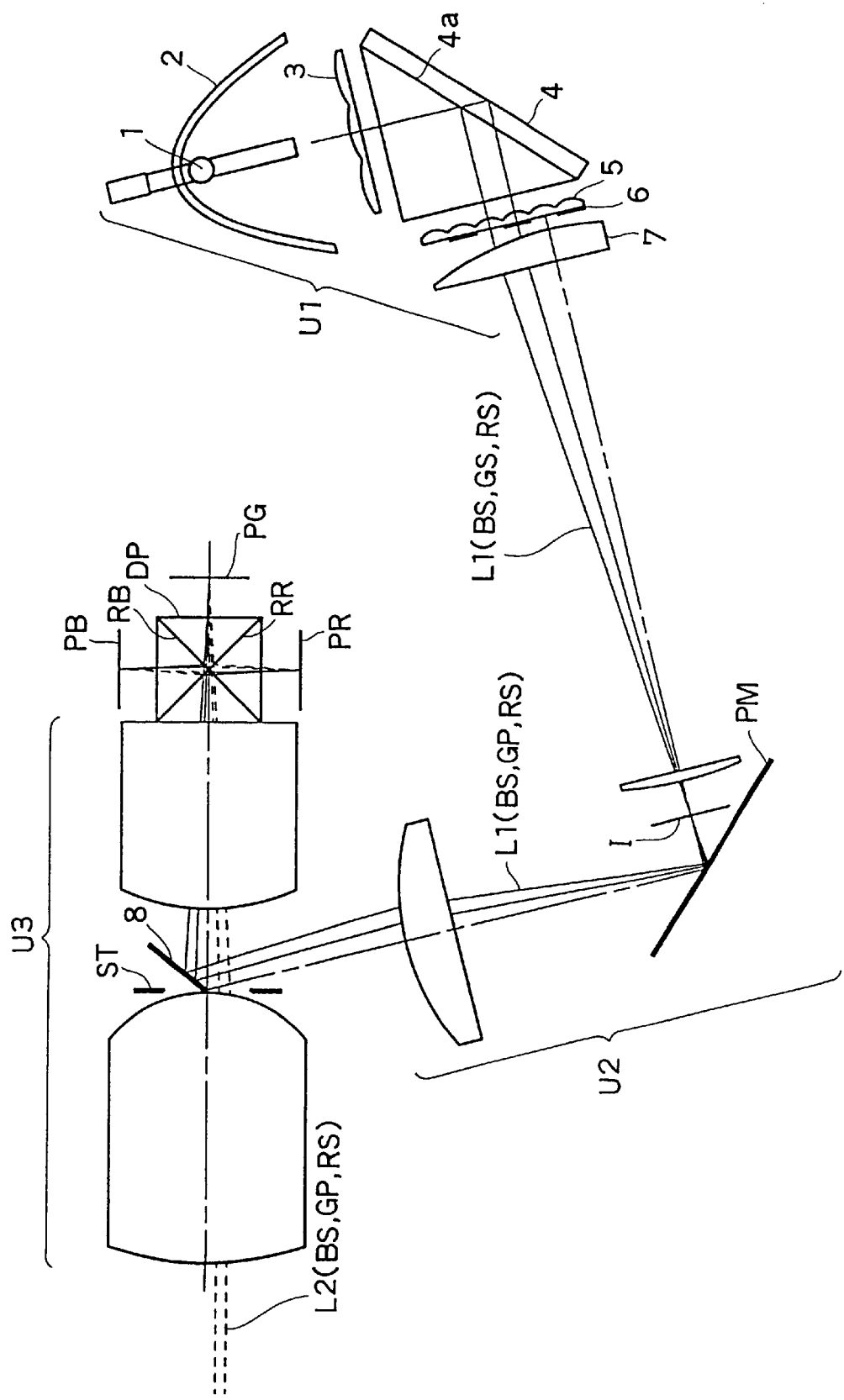
FIG. 2 is a sectional view of a panel-reflection-type liquid crystal projector having a color separating/integrating cross dichroic prism according to the present invention.

FIG. 2 shows an example of a liquid crystal projector of the separated-pupil illumination type embodying the invention that employs reflection-type liquid crystal panels. This liquid crystal projector is provided with a light source unit (U1), an illumination relay optical system (U2), a color separating/integrating cross dichroic prism (DP), reflection-type liquid crystal panels (PR, PG, and PB), a projection lens system (U3), and other components. The projection lens system (U3) includes a reflecting mirror (8) that directs illumination light (L1) to the liquid crystal panels (PR, PG, and PB). The light source unit (U1) is composed of a light source (1), a reflector (2), a first lens array (3), a polarizing prism (4), a second lens array (5), a half-wave plate (6), a merging lens element (7), and other components. The illumination relay optical system (U2) includes a polarization conversion dichroic mirror (PM) described previously.

The beam of randomly-polarized white light emitted from the light source (1) is first reflected from the reflector (2), is then separated into an S-polarized light component and a P-polarized light component by the polarizing-separating surface (4a) of the polarizing prism (4), and then forms a light source image on the second lens array (5). Then, the P-polarized light component is converted into an S-polarized light component by the half-wave plate (6). Thereafter, the light beam, now containing only an S-polarized light component, passes through the merging lens element (7). In this way, linearly-polarized white light (BS, GS, and RS) is emitted as illumination light (L1) from the light source unit (U1). The illumination light (L1) is then relayed by the illumination relay optical system (U2) so as to be re-focused in the vicinity of the aperture stop (ST) (I: a virtual image plane). In the illumination relay optical system (U2), of the illumination light (L1), only the G (green) light component is converted into a P-polarized light component (GP) by the polarization conversion dichroic mirror (PM).

Then, the illumination light (L1: BS, GP, and RS) is reflected from the reflecting mirror (8) disposed in the vicinity of the aperture stop (ST), and is thereby introduced into the projection lens system (U3). After passing through the rear portion of the projection lens system (U3), the illumination light (L1) enters the cross dichroic prism (DP). The cross dichroic prism (DP) has a B reflecting surface (RB) and an R reflecting surface (RR). Of the light components of three primary colors (R, G, and B) constituting the white light (L1), the B (blue) light component (BS) is reflected from the B reflecting surface (RB), and the R (red) light component (RS) is reflected from the R reflecting surface (RR). Thus, the cross dichroic prism (DP) lets the G (green) light component (GP) pass straight through the B and R reflecting surfaces (RB and RR) and simultaneously reflects the R and B light components (RS and BS) in opposite directions. In this way, the illumination light (L1) is separated into three light components of different colors (BS, GP, and RS).

On the optical paths of the individual light components of three colors (BS, GP, and RS) thus separated are disposed the three reflection-type liquid crystal panels (PB, PG, and PR), which display the images of their respective light components. Thus, the individual light components of three colors (BS, GP, and RS) illuminate the display surfaces of their respective reflection-type liquid crystal panels (PB, PG, and PR), and are then reflected therefrom and thereby modulated. The light components of three colors (BS, GP, and RS) reflected from the liquid crystal panels (PB, PG, and PR) are then integrated together by the cross dichroic prism (DP) so as to be formed into a projection light beam (L2), which is then projected through the projection lens system (U3) to form an enlarged, color-integrated image on a screen (not shown).

As shown in FIG. 2, the polarization conversion dichroic mirror (PM) is disposed in the vicinity of the virtual image plane (I) formed within the illumination relay optical system (U2). In this way, by securing a telecentric area such as the virtual image plane (I) and disposing the polarization conversion dichroic mirror (PM) in that area, it is possible to minimize the effect of differences in incident angle, and thereby alleviate uneven color distribution. Where it is impossible to secure an appropriate telecentric optical path, it is preferable that the dichroic surface (DM) of the polarization conversion dichroic mirror (PM) be formed as a gradient thickness film that offers different cutoff wavelengths in different regions thereof. By the use of such a dichroic surface (DM), it is possible to correct variations in cutoff wavelength due to differences in incident angle.

In the liquid crystal projector described above, the polarization conversion dichroic mirror (PM) disposed between the light source unit (U1) and the cross dichroic prism (DP) makes the polarization direction of the G light component (GS) perpendicular to the polarization directions of the B and R light components (BS and RS) (that is, the G light component (GS) is converted into P-polarized light (GP)), and then directs the illumination light (L1) to the cross dichroic prism (DP). The reason why such a structure is adopted will be described below.

Here, it is assumed that the G light component covers a wavelength range from 510 nm to 580 nm, the B light component covers a wavelength range below 510 nm, and the R light component covers a wavelength range above 580 nm. In this case, the energy is reduced to 50% at the wavelengths of 510 nm and 580 nm. Moreover, FIG. 6 is a graph showing the spectral characteristics of the R reflecting surface (RR) of the cross dichroic prism (DP) (the incident angle=45°), and FIG. 7 is a graph showing the spectral characteristics of the B reflecting surface (RB) of the cross dichroic prism (DP) (the incident angle=45°).

Figure 6:
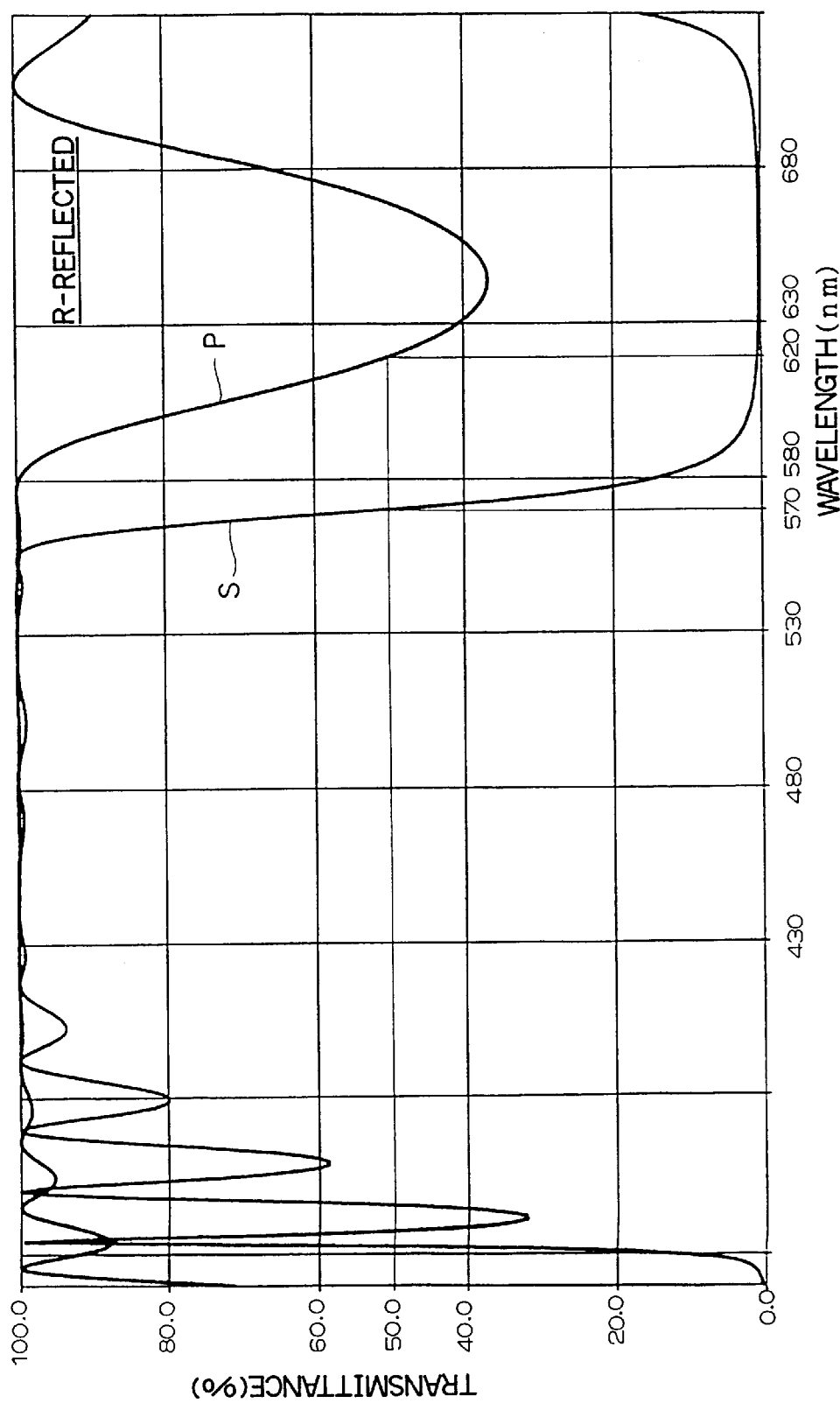
FIG. 6 is a graph showing the spectral characteristics of the R reflecting surface of the cross dichroic prism.

As will be understood from the graph shown in FIG. 6, the cutoff wavelength of the R reflecting surface (RR) is shorter for S-polarized light than for P-polarized light. By the use of the R reflecting surface (RR) that has a cutoff wavelength of 570 nm for S-polarized light, the R light component (RS) of the illumination light (L1) that covers a wavelength range above 580 nm can be efficiently reflected from the R reflecting surface (RR) so as to illuminate the liquid crystal panel (PR). At this time, the R reflecting surface (RR) has a cutoff wavelength of about 620 nm for P-polarized light, and therefore the G light component (GP) of the illumination light (L1) that covers a wavelength range below 580 nm passes through the R reflecting surface (RR) efficiently so as to illuminate the liquid crystal panel (PG). This helps minimize the loss in the quantity of light on the R reflecting surface (RR).

Figure 7:
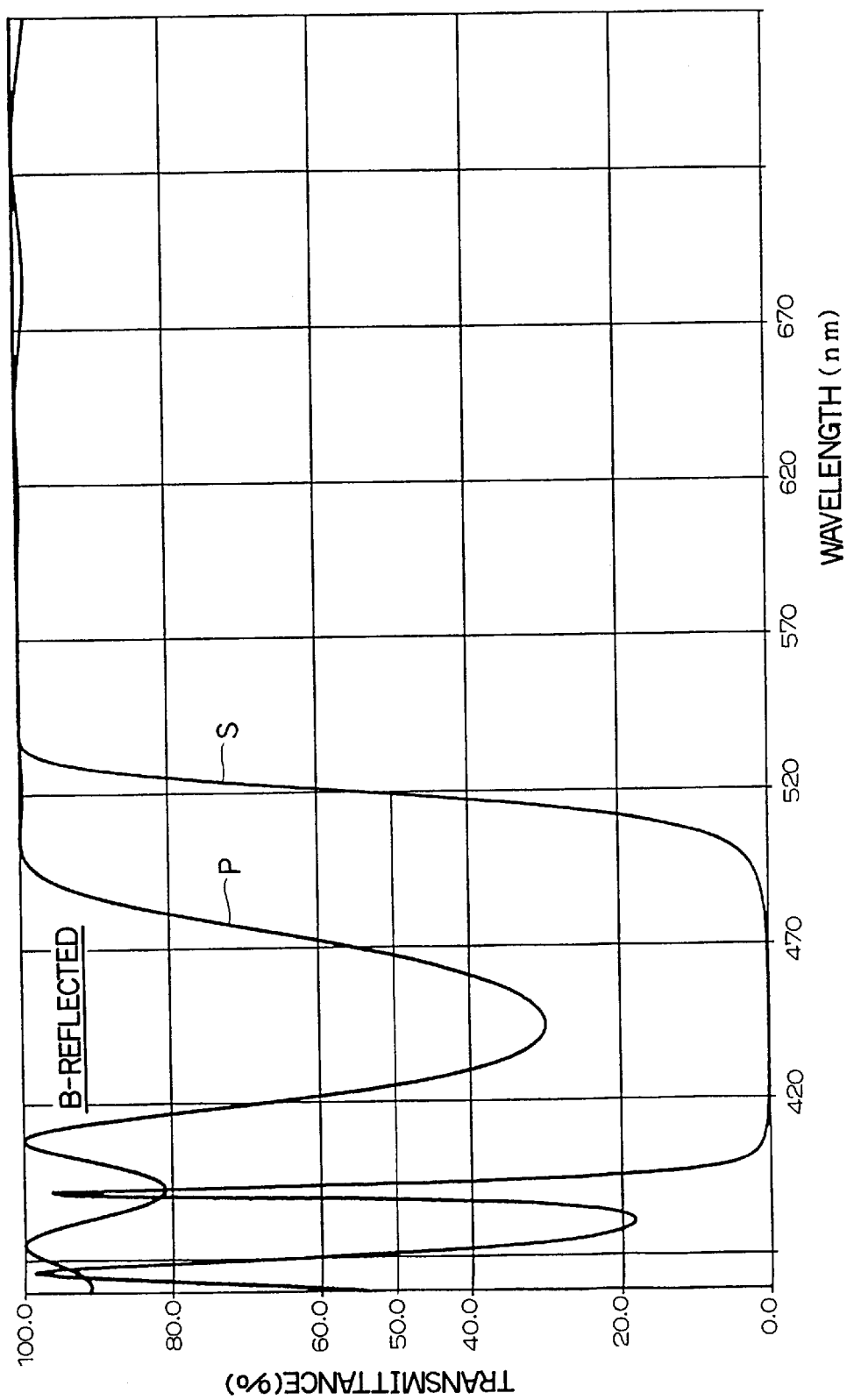
FIG. 7 is a graph showing the spectral characteristics of the B reflecting surface of the cross dichroic prism.

As will be understood from the graph of FIG. 7, the cutoff wavelength of the B reflecting surface (RB) is longer for S-polarized light than for P-polarized light. By the use of the B reflecting surface (RB) that has a cutoff wavelength of 520 nm for S-polarized light, the B light component (BS) of the illumination light (L1) that covers a wavelength range below 510 nm can be efficiently reflected from the B reflecting surface (RB) so as to illuminate the liquid crystal panel (PB). At this time, the B reflecting surface (RB) has a cutoff wavelength of about 470 nm for P-polarized light, and therefore the G light component (GP) of the illumination light (L1) that covers a wavelength range above 510 nm passes through the B reflecting surface (RB) efficiently so as to illuminate the liquid crystal panel (PG). This helps minimize the loss in the quantity of light on the B reflecting surface (RB).

Figure 11:
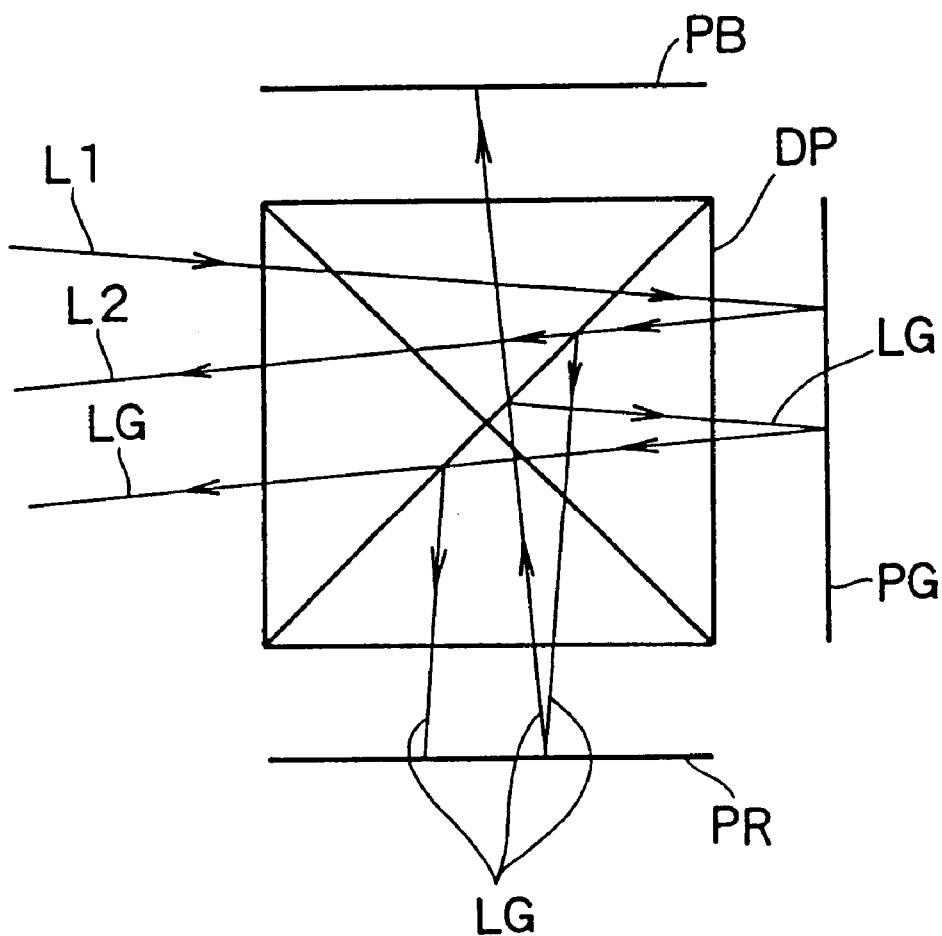
FIG. 11 is a sectional view schematically illustrating the stray light appearing in the cross dichroic prism illustrated in FIG. 10.

The individual light components of three colors (BS, GP, and RS) obtained as a result of color separation are reflected from their respective liquid crystal panels (PB, PG, and PR), with their polarization directions kept unchanged. Accordingly, when the light components of three colors (BS, GP, and RS) are shone onto the cross dichroic prism (DP) next time so as to be subjected to color integration, it is possible to achieve color integration as efficiently as color separation. In this way, it is possible to minimize the loss in the quantity of light in the wavelength ranges around cutoff wavelengths, and thereby obtain higher illumination efficiency and satisfactory brightness in the projected image. Moreover, minimizing the loss in the quantity of light on the cross dichroic prism (DP) helps substantially eliminate stray light (LG) (FIG. 11). This makes it possible to obtain a high-contrast and high-quality projected image without ghosts. Furthermore, since the cutoff wavelengths of the cross dichroic prism (DP) are set with sufficient margins secured around the wavelength ranges of the light components of three colors (BS, GP, and RS), even if light rays enter the cross dichroic prism (DP) at varying angles, variations in cutoff wavelength due to differences in incident angle exert no serious effect. This helps alleviate uneven color distribution.

<Panel-Transmission-Type Liquid Crystal Projector (FIG. 3)>

Figure 3:
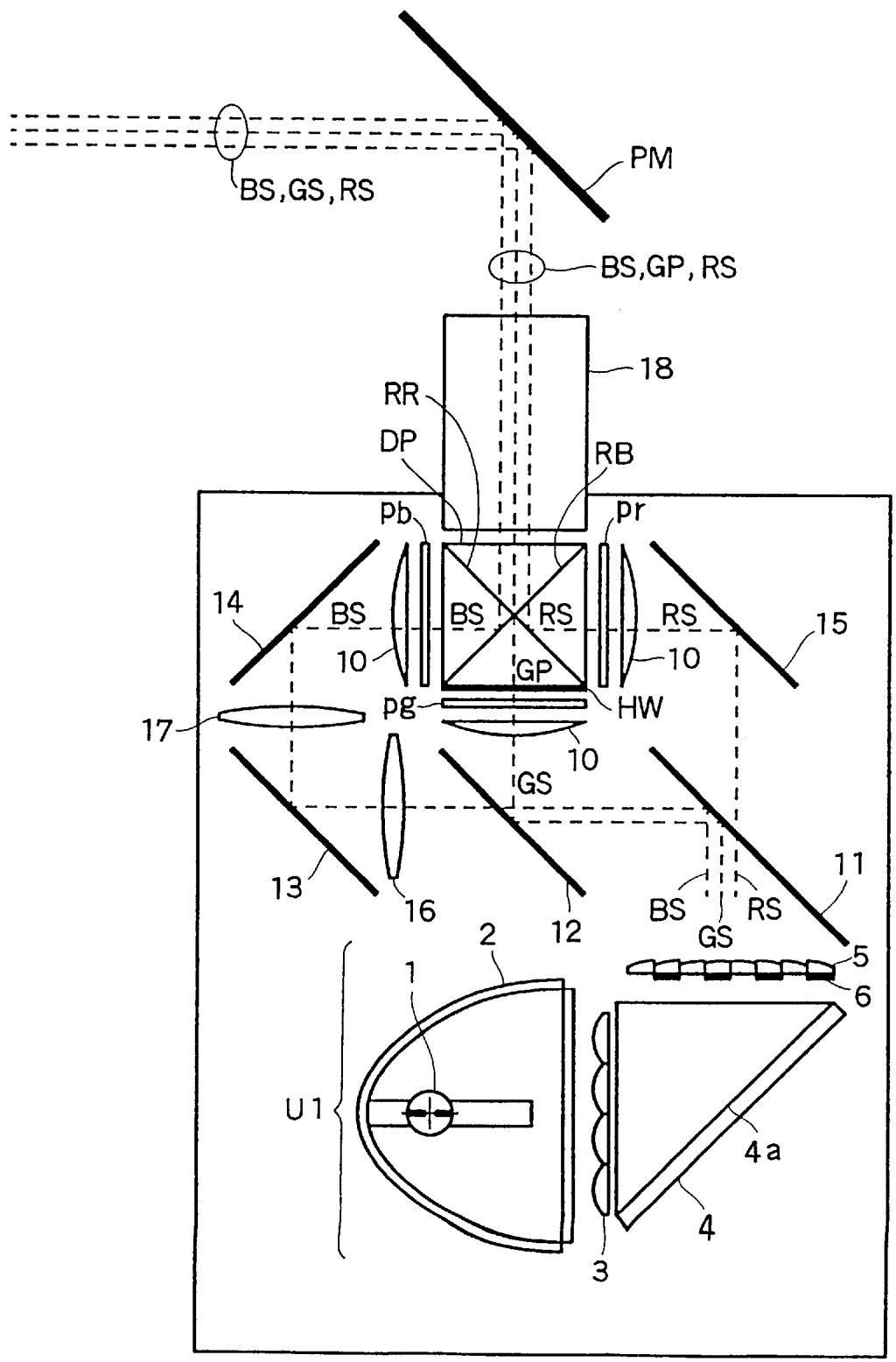
FIG. 3 is a sectional view of a panel-transmission-type liquid crystal projector having a color-separating dichroic mirror and a color-integrating cross dichroic prism according to the present invention.

FIG. 3 shows an example of a liquid crystal projector embodying the present invention that employs transmission-type liquid crystal panels. This liquid crystal projector is provided with a light source unit (U1), color-separating dichroic mirrors (11 and 12), a color-integrating cross dichroic prism (DP), a half-wave plate (HW), transmission-type liquid crystal panels (pr, pg, and pb), a projection lens system (18), a polarization conversion dichroic mirror (PM), a field lens (10), turning mirrors (13 to 15), a condenser lens (16), a relay lens (17), and other components. The light source unit (U1) is composed of a light source (1), a reflector (2), a first lens array (3), a polarizing prism (4), a second lens array (5), a half-wave plate (6), and other components.

The beam of randomly-polarized white light emitted from the light source (1) is first reflected from the reflector (2), is then separated into an S-polarized light component and a P-polarized light component by the polarizing-separating surface (4a) of the polarizing prism (4), and then forms a light source image on the second lens array (5). Then, the P-polarized light component is converted into an S-polarized light component by the half-wave plate (6). Now, the light beam contains only an S-polarized light component. In this way, linearly-polarized white light (BS, GS, and RS) is emitted as illumination light from the light source unit (U1). The illumination light (BS, GS, and RS) is separated into three light components of different colors (BS, GS, and RS) by the dichroic mirror (11) that transmits only an R (red) light component and the dichroic mirror (12) that transmits only a B (blue) light component.

On the optical paths of the individual light components of three colors (BS, GS, and RS) thus separated are disposed the three transmission-type liquid crystal panels (pb, pg, and pr), which display the images of their respective light components. The G light component (GS) passes through the field lens (10), and thereafter illuminates the liquid crystal panel (pg). The R light component (RS) is first reflected from the turning mirror (15), then passes through the field lens (10), and thereafter illuminates the liquid crystal panel (pr). The B light component (BS) passes through the condenser lens (16), the turning mirror (13), the relay lens (17), the turning mirror (14), and the field lens (10) in this order, and thereafter illuminates the liquid crystal panel (pb).

The individual light components of three colors (BS, GS, and RS), after illuminating their respective liquid crystal panels (pb, pg, and pr), are transmitted therethrough and thereby modulated, and then enter the cross dichroic prism (DP) so as to be subjected to color integration. Then, the G light component (GS) is converted into a P-polarized light component (GP) by the half-wave plate (HW). The light components of three colors (BS, GP, and RS), after exiting from the cross dichroic prism (DP), pass through the projection lens system (18), and are then integrated together by the polarization conversion dichroic mirror (PM) into a projection light beam (BS, GS, and RS) containing only an S-polarized light component. The projection light beam (BS, GS, and RS) is shone onto a screen (not shown) so as to project thereon, with enlargement, the images displayed on the liquid crystal panels (pr, pg, and pb).

In this embodiment, the polarization conversion dichroic mirror (PM), which converts the G light component from P-polarized light to S-polarized light, has the same structure as that of the previously-described polarization conversion dichroic mirror (PM) shown in FIG. 1. Its dichroic surface (DM) transmits the G light component (GP) and reflects the B and R light components (BS and RS). Thus, of the projection light beam (BS, GP, and RS), the B and R light components (BS and RS) are reflected from the dichroic surface (DM) while being kept S-polarized. On the other hand, the G light component (GP) of the projection light beam (BS, GP, and RS) passes through the dichroic surface (DM) as P-polarized light, then passes through the quarter-wave plate (QW), is then reflected from the mirror surface (RM), then, passes through the quarter-wave plate (QW) once again, and then passes through the dichroic surface (DM). The G light component passes through the quarter-wave plate (QW) twice, and meanwhile has its polarization direction rotated through 90 degrees, thereby being converted into S-polarized light. Thus, the reflection achieved by the polarization conversion dichroic mirror (PM) makes it possible to produce a projection light beam (BS, GS, and RS) in which the light components of all colors are S-polarized.

In the liquid crystal projector described above, the light components of three colors (BS, GS, and RS) transmitted through the liquid crystal panels (pb, pg, and pr) are shone onto the cross dichroic prism (DP) with the polarization direction of the G light component (GS) kept perpendicular to the polarization directions of the other light components (BS and RS) (i.e. with the G light component (GS) converted into P-polarized light (GP)). Then, by the polarization conversion dichroic mirror (PM) disposed on the screen (not shown) side of the cross dichroic prism (DP), the polarization directions of the light components of three colors (BS, GP, and RS) are made uniform, i.e. S-polarized. The reason why the polarization directions are converted in this way will be described below.

In general, exposing the exiting side of a transmission-type liquid crystal panel to light ends in damaging switching transistors provided therein. This causes, for example, noise and thereby degrades image quality. In a panel-transmission-type liquid crystal projector employing a cross dichroic prism (DP) as shown in FIG. 3, for example, there is a possibility that a part of the projection light beam reflected from the liquid crystal panel (pg) for the G light component is reflected from the R reflecting surface (RR). This causes that part of the projection light beam reflected from the liquid crystal panel (pg) to strike the exiting side of the liquid crystal panel (pb) for the B light component, and thereby causes noise in the image displayed on this liquid crystal panel (pb).

To solve this problem, it is customary to use a half-wave plate. Specifically, as illustrated in FIG. 3, by disposing a half-wave plate (HW) on the liquid-crystal-panel (pb) side of the cross dichroic prism (DP), it is possible to convert only the G light component (GS) into P-polarized light (GP) with respect to the R reflecting surface (RR). This helps suppress reflection of the G light component (GP) from the R reflecting surface (RR). Even if reflected therefrom, the G light component (GP), now P-polarized, is not allowed to strike the exiting side of the liquid crystal panel (pb) for the B light component, because, this liquid crystal panel (pb) has a polarizing plate (not shown) that transmits only S-polarized light fitted on its exiting side.

A problem here is that, also in the projection light beam emerging from the cross dichroic prism (DP), the G light component (GP) has a different polarization direction from the other light components (BS and RS). Thus, in a case where an image is projected onto a polarizing screen designed to inhibit reflection of an unnecessary image, the G light component (GP) is not reflected from the screen, and thus a proper color balance is not achieved in the projected image. To solve this problem, it is customary to use a quarter-wave plate. By fitting a quarter-wave plate to the projection-lens-system (18) side of the cross dichroic prism (DP), it is possible to convert the light components of three colors (BS, GP, and RS) into circularly-polarized light. This makes it possible to project an image onto a polarizing screen without destroying the color balance of the projected image. In this case, however, the image projected on the polarizing screen has half its original brightness.

To solve this problem, the liquid-crystal projector shown in FIG. 3 has a polarization conversion dichroic mirror (PM) disposed on the screen (not shown) side of a cross dichroic prism (DP). The projection light beam (BS, GP, and RS) in which only the G light component is P-polarized is reflected from the polarization conversion dichroic mirror (PM), and thereby the G light component (GP) is converted into S-polarized light. In this way, the polarization directions of the light components of three colors constituting the projection light beam are made uniform. i.e. S-polarized (BS, GS, and RS). This makes it possible to use a polarizing screen without destroying the color balance or reducing the brightness by half, and thus makes it possible to obtain sufficiently high efficiency and achieve a proper color balance.

<Panel-Reflection-Type Liquid Crystal Projector (FIGS. 4, 8, and 9)>

Figure 4:
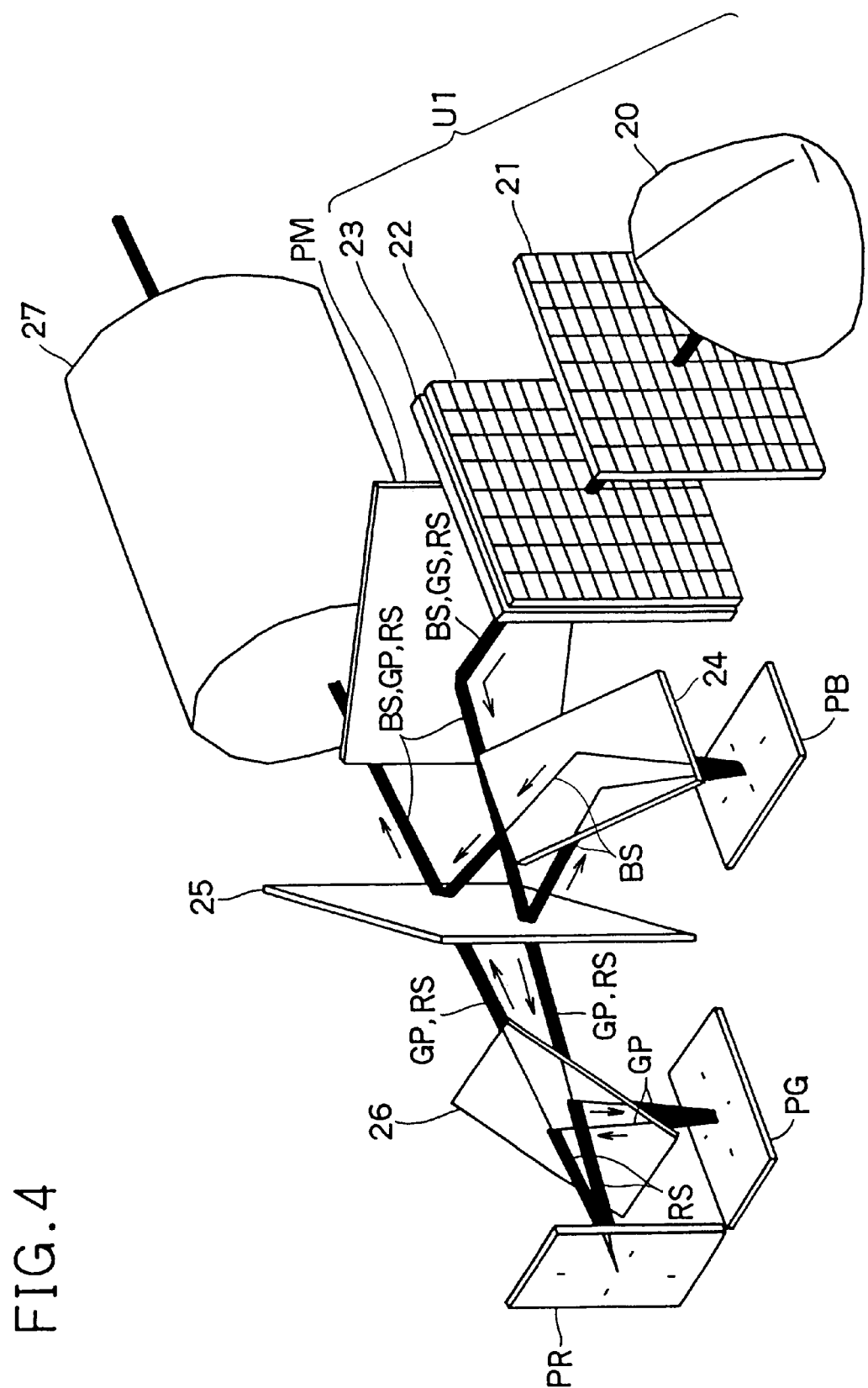
FIG. 4 is a perspective view of a panel-reflection-type liquid crystal projector having a color separating/integrating dichroic mirror according to the present invention.

FIG. 4 shows an example of a liquid crystal projector embodying the invention that employs reflection-type liquid crystal panels. This liquid crystal projector is provided with a light source unit (U1), a polarization conversion dichroic mirror (PM), color separating/integrating dichroic mirrors (25 and 26), a reflecting mirror (24), reflection-type liquid crystal panels (PR, PG, and PB), a projection lens system (27), and other components. The light source unit (U1) is composed of a lamp (20), a first lens array (21), a second lens array (22), a polarizing separating plate (23), and other components.

Figure 8:
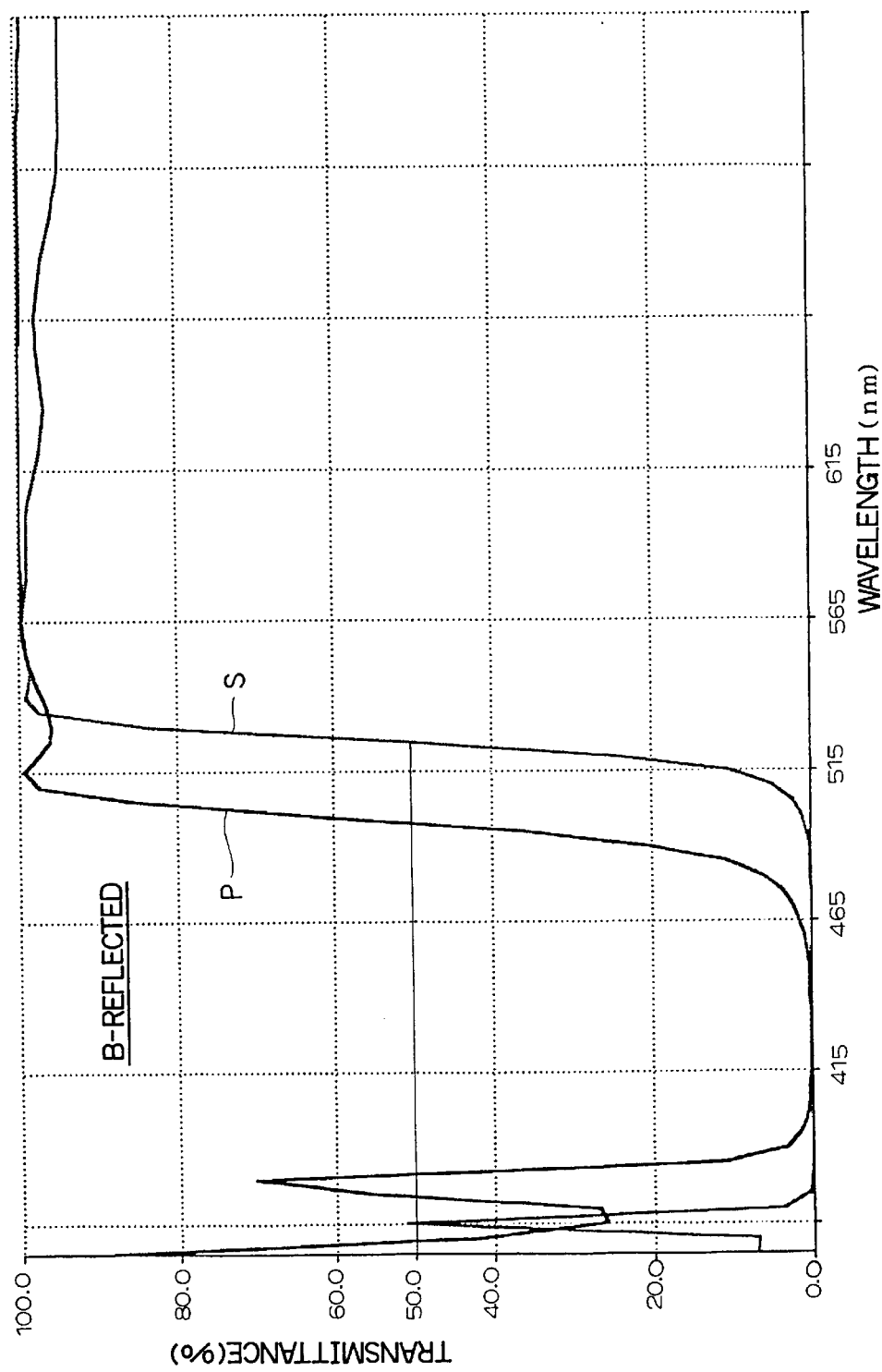
FIG. 8 is a graph showing the spectral characteristics of the dichroic mirror that reflects the B light component.
Figure 9:
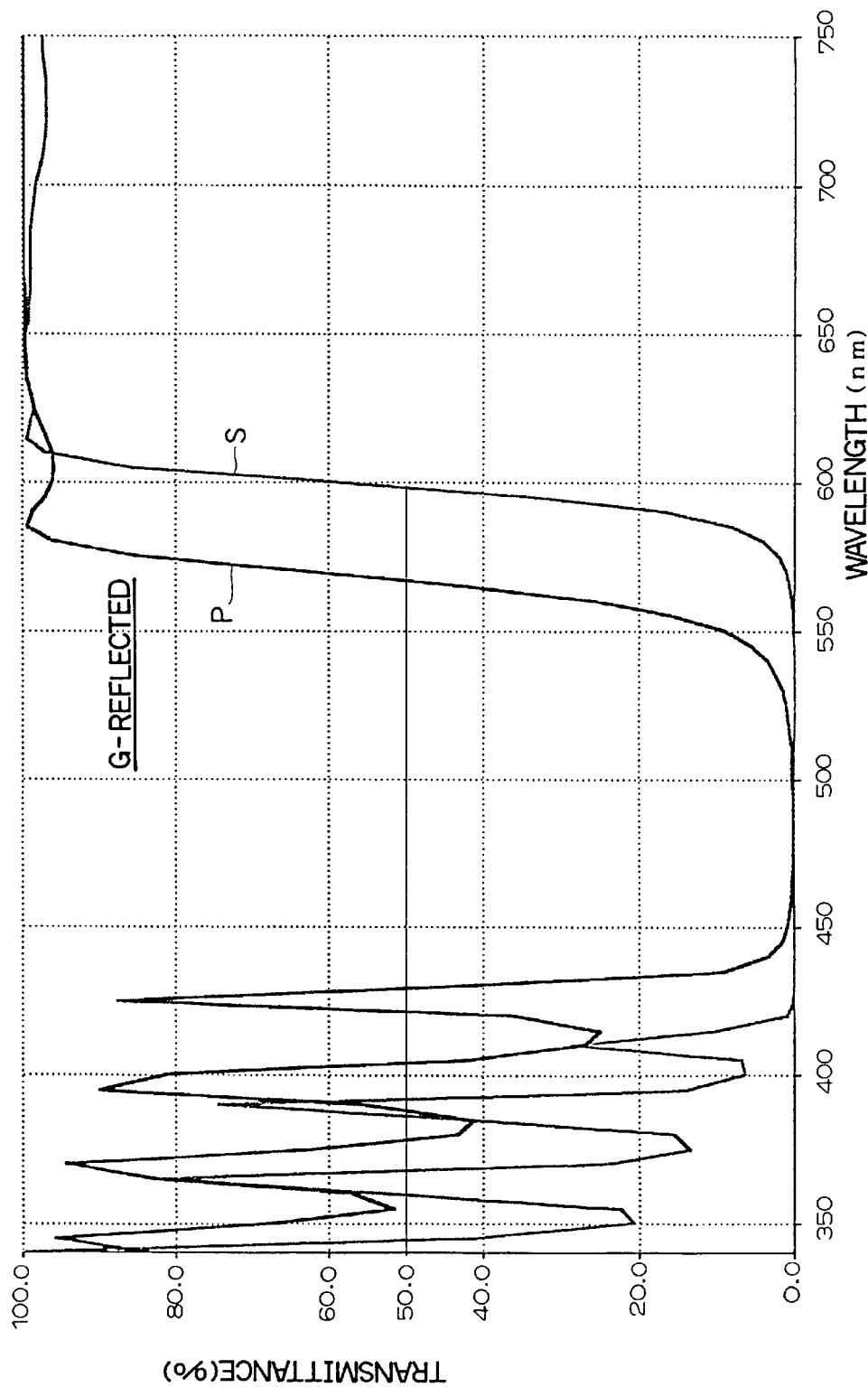
FIG. 9 is a graph showing the spectral characteristics of the dichroic mirror that reflects the G light component.
Figure 10:
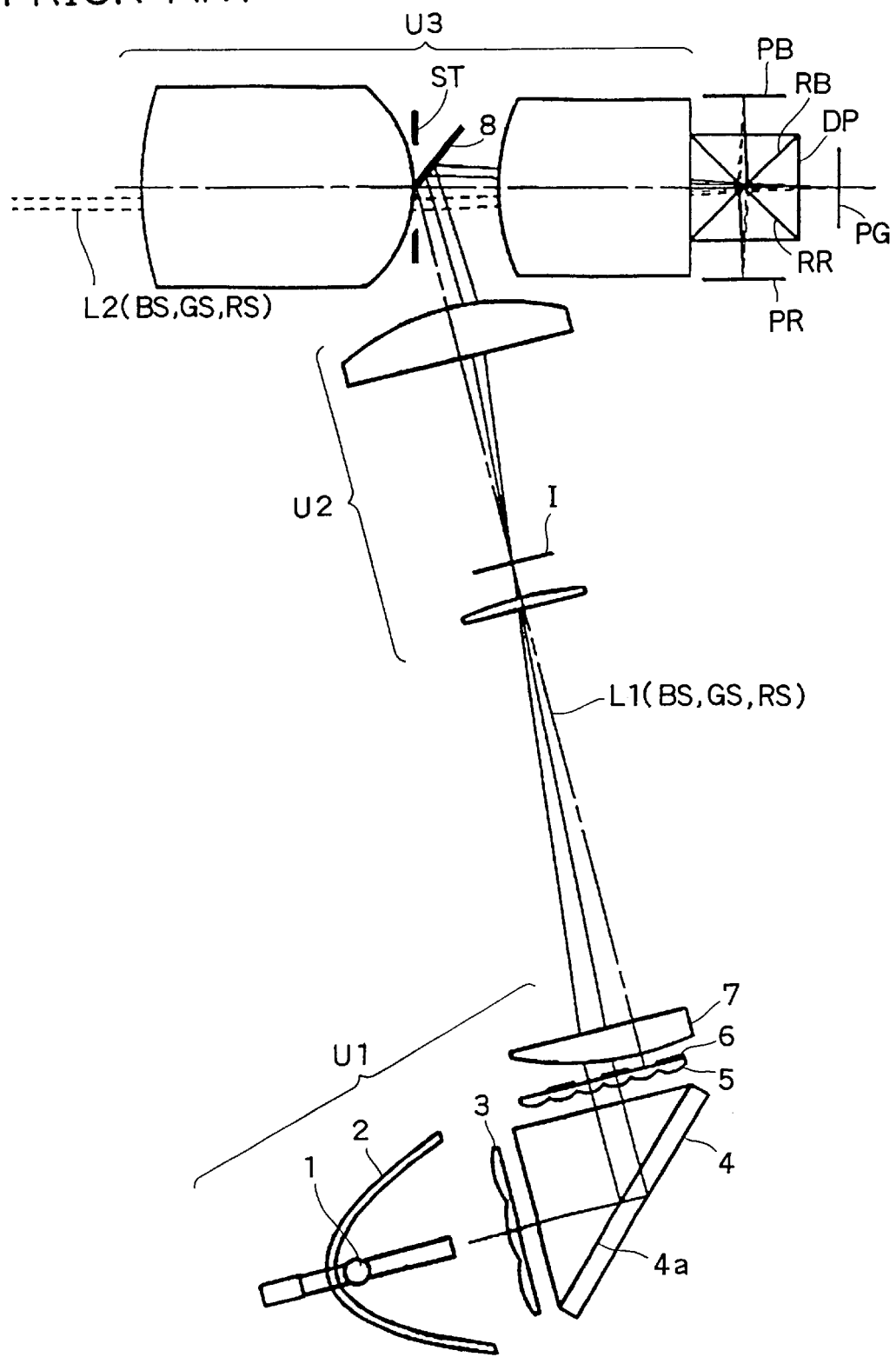
FIG. 10 is a sectional view of a conventional panel-reflection-type liquid crystal projector having a color separating/integrating cross dichroic prism.

Now, how the individual components constituting the liquid crystal projector function will be described along the optical path. In the following descriptions, the polarization directions of light components are represented with respect to the dichroic mirror (25) that reflects the B light component. The beam of randomly-polarized white light emitted from the lamp (20) then forms a light source image on the second lens array (22), and is then converted into S-polarized light by the polarizing separating plate (23). In this way, linearly-polarized white light (BS, GS, and RS) is emitted as illumination light from the light source unit (U1). The illumination light (BS, GS, and RS) is then reflected from the polarization conversion dichroic mirror (PM), and thereby only the G light component (GS) thereof is converted into P-polarized light. The illumination light (BS, GP, and RS) is then separated into three light components of different colors (BS, GP, and RS) by the dichroic mirror (25) that reflects the B (blue) light component and the dichroic mirror (26) that reflects the G (green) light component. FIG. 8 is a graph showing the spectral characteristics of the dichroic mirror (25) (the incident angle=45°), and FIG. 9 is a graph showing the spectral characteristics of the dichroic mirror (26) (the incident angle=45°).

On the optical paths of the individual light components of three colors (BS, GP, and RS) thus separated are disposed the three reflection-type liquid crystal panels (PB, PG, and PR), which display the images of their respective light components. Thus, the individual light components of three colors (BS, GP, and RS) illuminate the display surfaces of their respective reflection-type liquid crystal panels (PB, PG, and PR), and are then reflected therefrom. Note that the liquid crystal panel (PB) for the B light component is illuminated by and reflects the B light component by way of the reflecting mirror (24). The light components of three colors (BS, GP, and RS) reflected from the liquid crystal panels (PB, PG, and PR) are then integrated together by the dichroic mirrors (25 and 26) so as to be formed into a projection light beam (BS, GP, and RS), which is then projected through the projection lens system (27) to form an enlarged, color-integrated image on a screen (not shown).

The liquid-crystal projector of this embodiment employs dichroic mirrors (25 and 26) to achieve color integration. Therefore, in this liquid-crystal projector, in contrast to cases where a cross dichroic prism is used to achieve color integration (see FIGS. 2 and 3), it is necessary to secure a sufficiently long back focal length in the projection lens system (27). If a projection lens system (27) having a long back focal length is built as a telecentric system, the projection lens system (27) needs to have an unpractically large size. Accordingly, here, the projection lens system (27) is built as a non-telecentric system. This, however, causes light rays to enter the dichroic mirrors (25 and 26) at varying angles according to the image height, and thus causes the cutoff wavelength to vary with the image height. As a result, it is impossible to achieve even color distribution.

To alleviate the adverse effect resulting from the non-telecentric configuration of the projection lens system (27), it is desirable that the light components covering wavelength ranges contiguous to each other have different polarization directions. Of the S-polarized white light (BS, GS, and RS) emitted from the light source unit (U1), only the G light component (GS) is converted into P-polarized light by the polarization conversion dichroic mirror (PM). Then, the dichroic mirror (25) reflects, of the illumination light (BS, GP, and RS), the B light component (BS) and transmits the other light components (GP and RS). Here, the B light component (BS) is reflected as S-polarized light and the G light component (GP) is transmitted as P-polarized light. Thus, as shown in FIG. 8, there remain sufficient margins around the wavelength ranges of the light components of three colors relative to the cutoff wavelengths of the dichroic mirror (25). Accordingly, a slight variation in the incident angle does not have a serious effect on how the light components of three colors are transmitted and reflected. This helps prevent uneven color distribution.

The dichroic mirrors (25) and (26) are disposed at an angle with respect to each other; specifically, they are so disposed that the plane including the optical axis passing through the mirror (25) and the normal to the surface thereof is perpendicular to the plane including the optical axis passing through the mirror (26) and the normal to the surface thereof. Thus, the G light component (GP) transmitted through the dichroic mirror (25) is shone onto the dichroic mirror (26) as S-polarized light, and the R light component (RS) transmitted through the dichroic mirror (25) is shone onto the dichroic mirror (26) as P-polarized light. There, the G light component (GP) is reflected as S-polarized light, and the R light component (RS) is transmitted as P-polarized light. Thus, as shown in FIG. 9, there remain sufficient margins around the wavelength ranges of the light components of three colors relative to the cutoff wavelengths of the dichroic mirror (26). Accordingly, a slight variation in the incident angle does not have a serious effect on how the light components of three colors are transmitted and reflected. This helps prevent uneven color distribution.

As described above, the light components of three colors (BS, GP, and RS) are subjected to color separation without being significantly affected by variations in incident angle, and then illuminate the display surfaces of their respective liquid crystal panels (PB, PG, and PR). The light components of three colors (BS, GP, and RS) thus separated are reflected from their respective liquid crystal panels (PB, PG, and PR) with their polarization directions kept unchanged. Accordingly, when the light components of three colors (BS, GP, and RS) are shone onto the dichroic mirrors (25 and 26) next time so as to be subjected to color integration, it is possible to achieve color integration with as little effect of variations in incident angle as in color separation. In this way, it is possible to minimize uneven color distribution in the projected image.

What is claimed is:

1. A mirror comprising, from a side on which a light beam is incident:
    a dichroic surface for transmitting a light component covering a specific wavelength range and reflecting light components covering other wavelength ranges;
    a quarter-wave plate for rotating a polarization of the specific wavelength range covered by the light component transmitted through the dichroic surface, the dichroic surface being disposed on a first surface of the quarter-wave plate; and
    a reflecting surface for reflecting the light component having passed through the quarter-wave plate to direct it back to the quarter-wave plate, the reflecting surface being disposed on a second surface of the quarter-wave plate, the first and second surfaces being disposed on opposite sides of the quarter-wave plate.

2. A mirror as claimed in claim 1, wherein the specific wavelength range of the light component transmitted through the dichroic surface is a wavelength range of a G light component out of light components of R, G, and B used to form a full-color image.

3. A mirror as claimed in claim 1, wherein the specific wavelength range is from 510 nm to 580 nm.

4. An optical apparatus comprising:
    a mirror including, from a side on which a light beam is incident, a dichroic surface for transmitting a light component covering a specific wavelength range and reflecting light components covering other wavelength ranges, a quarter-wave plate for rotating a polarization of the specific wavelength range covered by the light component transmitted through the dichroic surface, the dichroic surface being disposed on a first surface of the quarter-wave plate, and a reflecting surface for reflecting the light component having passed through the quarter-wave plate to direct it back to the quarter-wave plate, the reflecting surface being disposed on a second surface of the quarter-wave plate, the first and second surfaces being disposed on opposite sides of the quarter-wave plate; and
    a polarization-conversion optical unit for shining a light beam onto the mirror, the light beam being composed of linearly-polarized light components of which all light components have a same polarization direction,
    wherein the mirror converts the light beam that is composed of linearly-polarized light components of which all light components have the same polarization direction into a light beam that is composed of linearly-polarized light components of which the light component that covers the specific wavelength range transmitted through the dichroic surface has a polarization direction perpendicular to a polarization direction of the light components covering other wavelength ranges.

5. An optical apparatus as claimed in claim 4, wherein the specific wavelength range of the light component transmitted through the dichroic surface is a wavelength range of a G light component out of light components of R, G, and B used to form a full-color image.

6. An optical apparatus as claimed in claim 4, wherein the specific wavelength range is from 510 nm to 580 nm.

7. An optical apparatus comprising:
    a mirror including, from a side on which a light beam is incident, a dichroic surface for transmitting a light component covering a specific wavelength range and reflecting light components covering other wavelength ranges, a quarter-wave plate for rotating a polarization of the specific wavelength range covered by the light component transmitted through the dichroic surface, the dichroic surface being disposed on a first surface of the quarter-wave plate, and a reflecting surface for reflecting the light component having passed through the quarter-wave plate to direct it back to the quarter-wave plate, the reflecting surface being disposed on a second surface of the quarter-wave plate, the first and second surfaces being disposed on opposite sides of the quarter-wave plate; and
    a polarization-conversion optical unit for shining a light beam onto the mirror, the light beam being composed of linearly-polarized light components of which the light component that covers the specific wavelength range transmitted through the dichroic surface has a polarization direction perpendicular to a polarization direction of the light components covering other wavelength ranges,
    wherein the mirror converts the light beam that is composed of linearly-polarized light components of which the light component that covers the specific wavelength range transmitted through the dichroic surface has a polarization direction perpendicular to a polarization direction of the light components covering other wavelength ranges into a light beam that is composed of linearly-polarized light components of which all light components have a same polarization direction.

8. An optical apparatus as claimed in claim 7, wherein the specific wavelength range of the light component transmitted through the dichroic surface is a wavelength range of a G light component out of light components of R, G, and B used to form a full-color image.

9. An optical apparatus as claimed in claim 7, wherein the specific wavelength range is from 510 nm to 580 nm.

10. A projector comprising:

a light source unit for emitting linearly-polarized white light;

a color separating unit for separating the white light emitted from the light source unit into a plurality of light components of different colors;

image display units, each one being disposed on an optical path of a corresponding one of said plurality of light components of different colors, the image display units being capable of displaying images of the light components and emitting the light components incident thereon after modulating the light components according to the images displayed thereon;

a color integrating unit for integrating the light components emitted from the image display units;

a projection optical system for displaying an image by projecting the thus integrated light components;

a mirror for reflecting the thus integrated light components, the mirror being disposed on an optical path between the color integrating unit and a screen, the mirror including, from a side on which a light beam is incident, a dichroic surface for transmitting a light component covering a specific wavelength range and reflecting light components covering other wavelength ranges, a quarter-wave plate for rotating a polarization of the specific wavelength range covered by the light component transmitted through the dichroic surface, the dichroic surface being disposed on a first surface of the quarter-wave plate, and a reflecting surface for reflecting the light component having passed through the quarter-wave plate to direct it back to the quarter-wave plate, the reflecting surface being disposed on a second surface of the quarter-wave plate, the first and second surfaces being disposed on opposite sides of the quarter-wave plate; and a polarization-conversion optical unit, disposed between the light source unit and the color integrating unit, for converting a polarization plane of the light component transmitted through the dichroic surface so as to make a polarization direction of the light component transmitted through the dichroic surface perpendicular to a polarization direction of the light components covering other wavelength ranges.

11. A projector as claimed in claim 10, wherein the specific wavelength range of the light component transmitted through the dichroic surface is a wavelength range of a G light component out of light components of R, G, and B used to form a full-color image.

12. A projector as claimed in claim 10, wherein the specific wavelength range is from 510 nm to 580 nm.

13. A projector comprising:

a light source unit for emitting linearly-polarized white light;

a color separating unit for separating the white light emitted from the light source unit into a plurality of light components of different colors;

image display units, each one being disposed on an optical path of a corresponding one of the plurality of light components of different colors, the image display units being capable of displaying images of the light components and emitting the light components incident thereon after modulating the light components according to the images displayed thereon;

a color integrating unit for integrating the light components emitted from the image display units;

a projection optical system for displaying an image by projecting the thus integrated light components;

a mirror for reflecting the thus integrated light components, the mirror being disposed on an optical path between the color integrating unit and a screen, the mirror including, from a side on which a light beam is incident, a dichroic surface for transmitting a light component covering a specific wavelength range and reflecting light components covering other wavelength ranges, a quarter-wave plate for rotating a polarization of the specific wavelength range covered by the light component transmitted through the dichroic surface, the dichroic surface being disposed on a first surface of the quarter-wave plate, and a reflecting surface for reflecting the light component having passed through the quarter-wave plate to direct it back to the quarter-wave Plate, the reflecting surface being disposed on a second surface of the quarter-wave plate, the first and second surfaces being disposed on opposite sides of the quarter-wave plate; and a polarization-conversion optical unit for converting a polarizing plane of the light component transmitted through the dichroic surface so as to make a polarization direction of the light component transmitted through the dichroic surface perpendicular to a polarization direction of the light components covering other wavelength ranges.

14. A projector as claimed in claim 13, wherein the specific wavelength range of the light component transmitted through the dichroic surface is a wavelength range of a G light component out of light components of R, G, and B used to form a full-color image.

15. A projector as claimed in claim 13, wherein the specific wavelength range is from 510 nm to 580 nm.

* * * * *